United States Patent [19]

Maeno et al.

[11] Patent Number: 4,678,696

[45] Date of Patent: Jul. 7, 1987

[54] WEATHER STRIP

[75] Inventors: Kunio Maeno, Aichi; Hisayuki Kisanuki, Ichinomiya, both of Japan

[73] Assignee: Toyoda Gosei Co., Ltd., Nishikasugai, Japan

[21] Appl. No.: 849,944

[22] Filed: Apr. 9, 1986

[30] Foreign Application Priority Data

Apr. 10, 1985 [JP] Japan .............................. 60-53249[U]

[51] Int. Cl.⁴ ............................................. E06B 7/16
[52] U.S. Cl. .................................... 428/122; 49/475; 49/495; 296/93; 428/358
[58] Field of Search ................. 428/93, 122, 358, 156; 296/93; 49/475, 484, 489, 495

[56] References Cited

U.S. PATENT DOCUMENTS

| | | | |
|---|---|---|---|
| 2,538,931 | 1/1951 | Zummach | 49/489 X |
| 3,222,769 | 12/1965 | LePlae | 428/122 X |
| 3,994,525 | 11/1976 | Breitschwerdt et al. | 52/172 X |
| 4,188,765 | 2/1980 | Jackson | 428/122 X |
| 4,334,398 | 6/1982 | Grether | 52/222 X |
| 4,420,019 | 12/1983 | Dillon | 428/358 X |
| 4,617,220 | 10/1986 | Ginster | 428/122 |

FOREIGN PATENT DOCUMENTS 1535030 12/1978 United Kingdom ............... 428/122

Primary Examiner—Henry F. Epstein
Attorney, Agent, or Firm—Cushman, Darby & Cushman

[57] ABSTRACT

There is disclosed a weather strip which comprises a metal insert of W shape in section and a covering member adapted to cover the insert and made of polymeric resilient materials. The insert is formed from a metal piece which includes two longitudinally extending primary portions in parallel relation, and a multiplicity of secondary portions each having a connecting portion interconnecting the primary portions and two projecting portions extending outwardly from opposite ends of the connecting portion. The projecting portions are bent upwardly and preselected connecting portions are cut off from one of the primary portions and are bent upwardly at right angles substantially from their centers.

2 Claims, 5 Drawing Figures

WEATHER STRIP

BACKGROUND OF THE INVENTION

This invention relates to a weather strip fitted, for example, with a door window assembly along which two panes of glass are slidable, and incorporating a metal insert of substantially W shape in section.

FIG. 1 illustrates a conventional weather strip 1 which generally comprises a W-shaped insert 3 made of metal, and a cover member 2 adapted to cover the insert 3 and made of rubber or polymeric resilient materials such as thermoplastic elastomer and the like by means of extrusion. The cover member 2 has two slots 1a, 1a along which two panes of glass are slidable and a grip 1b by which the weather strip 1 is attached to a sill moulding.

As shown in FIG. 2, the insert 3 is made from a metal piece 4, the metal piece 4 including two longitudinally extending primary portions 5, 5 in parallel relation and a multiplicity of secondary portions 6 extending perpendicularly to the primary portions 5, 5. Each of the secondary portions 6 has a connecting portion 6a interconnecting the primary portions 5, 5 and two projecting portions 6b, 6b extending outwardly from opposite ends of the connecting portion 6a.

Each of the connecting portions 6a is bent to an inverted U shape and each of the projecting portions 6b, 6b is upwardly bent at its center. In this manner, the insert 3 is formed to a substantially W shape in section.

It will be noted that slits 4a are formed between the primary portions 5, 5 and the secondary portions 6 to prevent the weather strip 1 from creasing at its inner periphery when so bent as to correspond to the corners of a sill moulding.

In the conventional insert 3, however, the connecting portions 6a of the metal piece 4 are bent at their centers in an overlapping fashion, causing to waste the sheet material while increasing the weight of the insert 3 per se and thus the weather strip 1.

SUMMARY OF THE INVENTION

It is therefore an object of this invention to provide a weather strip which enables reducing the weight of an insert per se without wasting a material used to form the insert.

In order to achieve the foregoing object, a weather strip according to this invention, comprises an insert made of metal and having W section, and a cover member adapted to cover the insert. The insert is made from a metal piece which includes two longitudially extending primary portions in parallel relation, and a multiplicity of secondary portions, each extending perpendicularly to the primary portions and having a connecting portion interconnecting the primary portions and two projecting portions extending outwardly from opposite ends of the connecting portion. The projecting portions are bent upwardly, and each of the preselected connecting portions is cut at one end from one of the primary portions and is bent upwardly at its center.

Further objects and advantages of the invention will become more apparent from the following detailed description taken in conjunction with the accompanying drawings.

DESCRIPTION OF THE PREFERRED EMBODIMENTS

Figure 1:
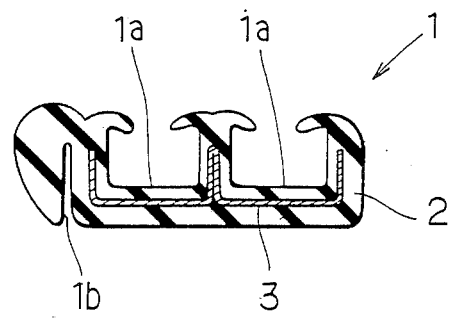
FIG. 1 is a sectional view of a conventional weather strip.
Figure 2:
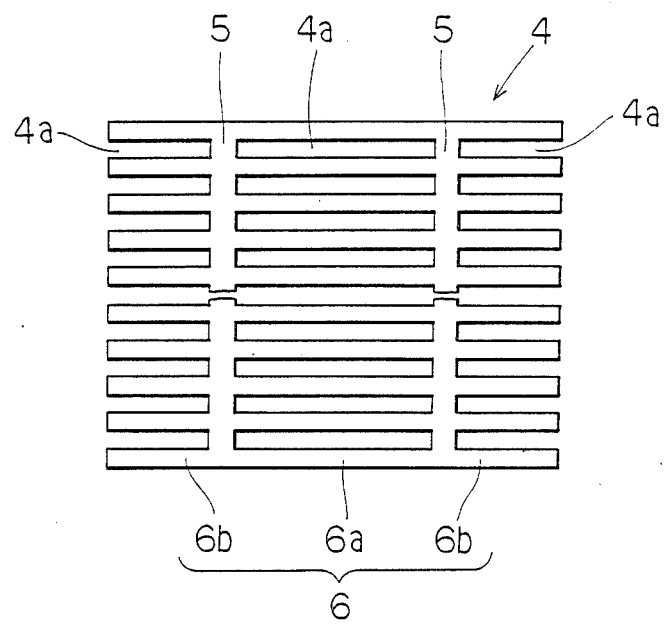
FIG. 2 is a plane view of a metal piece used to form an insert fitted within the weather strip of FIG. 1.
Figure 3:
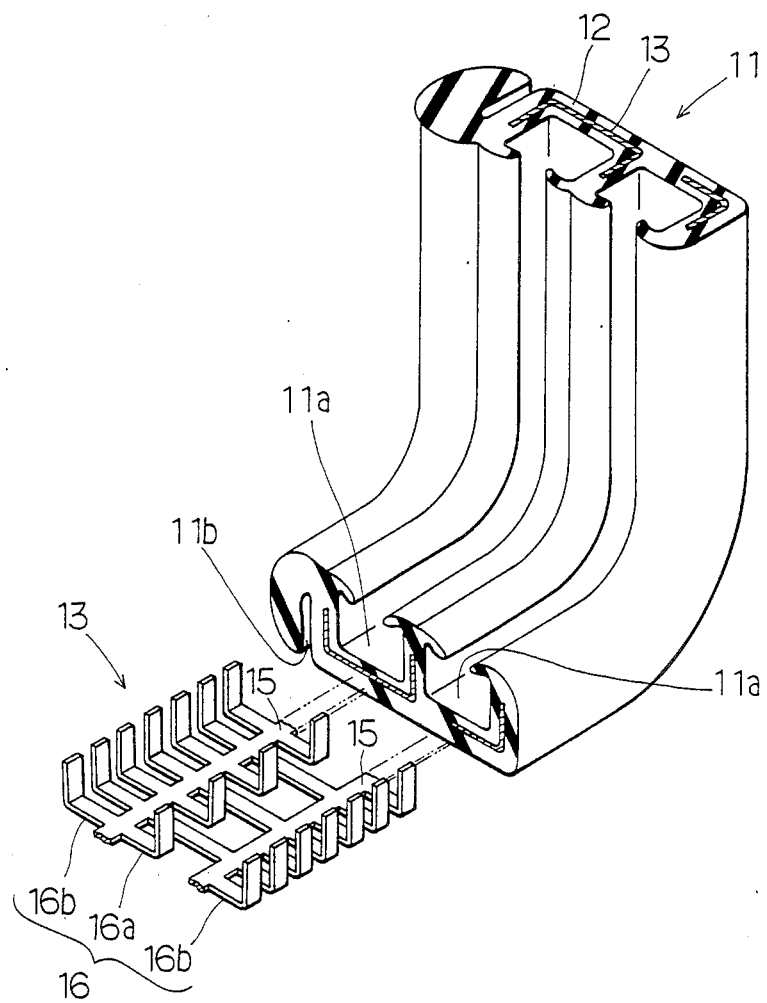
FIG. 3 is a perspective view of a weather strip according to a first embodiment of this invention.

FIG. 3 illustrates a weather strip 11 according to a first embodiment of this invention which comprises an insert 13 made of metal and having W section, and a cover member 12 made of rubber or polymeric resilient materials such as thermoplastic elastomer and the like by extrusion and adaped to cover the insert 13 as in a conventional weather strip. The weather strip 11 will be bent by a suitable jig so as to correspond to the corners of a sill moulding. The weather strip 11 has two slots 11a, 11a along which two panes of glass are slidable, and a grip 11b by which the weather strip 11 is attached to the sill moulding.

Figure 4:
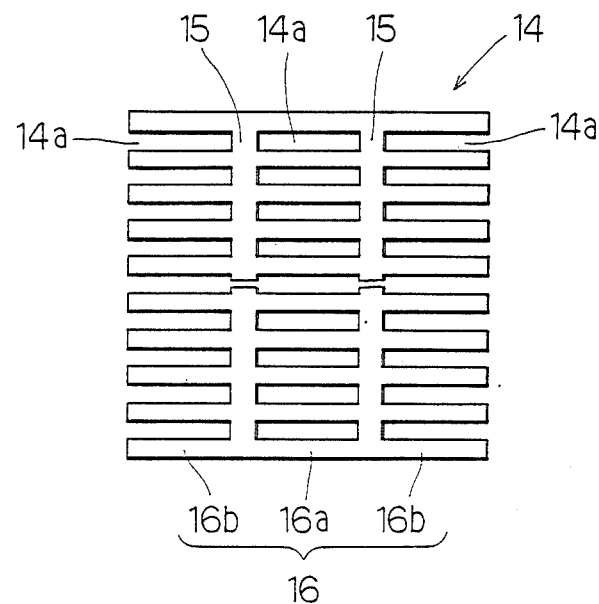
FIG. 4 is a plan view of a metal piece used to form an insert used in the first embodiment.

As shown in FIG. 4, the insert 13 is formed from a metal piece 14, the metal piece 14 including two longitudinally extending primary portions 15, 15 in parallel relation, and a multiplicity of secondary portions 16, each extending perpendicularly to the primary portions 15, 15 and having a connecting portion 16a interconnecting the primary portions 15, 15 and two projecting portions 16b, 16b extending outwardly from opposite ends of the connecting portion 16a.

The metal piece 14 is so formed that a sheet of metal is scored at predetermined positions by a punch press in the form of a roller to form slits 14a thereon while pulling the sheet out of a roller. Thereafter, tensile force is applied to the sheet placed between two rollers to stretch the same in its longitudinal direction.

All of the projecting portions 16b, 16b are bent upwardly at right angles substantially from their centers. The connecting portions 16a are alternately cut off from one of the primary portions 15, 15 and are upwardly bent at right angles substantially from their centers. The insert 13 is thus formed to W shape in section It will be noted that the cutting of the connecting portions 16a from the primary portions is carried out by a cutter roller after the piece 14 is formed from a sheet of metal. Thereafter, the bending of the projecting portions 16b, 16b and the connecting portions 16a is effected by a roll forming device. The piece is then conveyed by an extruder and is covered by the cover member 12 to form the weather strip 11.

In the weather strip 11 according to the first embodiment of the invention, the connecting portions 16a of the piece 14 are alternately cut off from one of the primary portions 15, 15 and are bent at right angles substantially from their centers. As opposed to the conventional insert 3, no overlapping takes place at the centers of the connecting portions in the insert 13. It is for these reasons that in forming the insert 13 to W shape in section, the length of the connecting portions 16a is about half of that of the connecting portions 6a. As a result, the insert 13 per se is about 20 to 25% less in weight than the conventional insert 3. This results in a reduction in the weight of the weather strip as well as the costs thereof.

Figure 5:
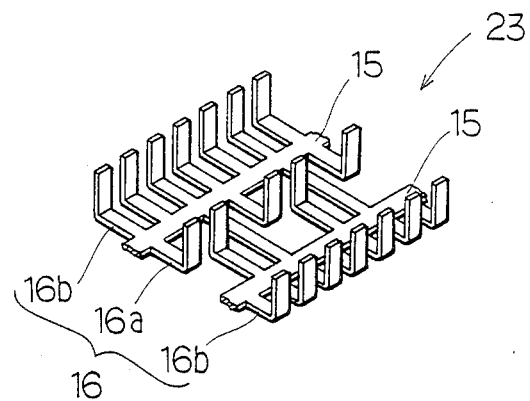
FIG. 5 is a perspective view of an insert used in a second embodiment of this invention.

According to the first embodiment, every second connecting portions 16a are cut off from one of the primary portions 15, 15. Alternatively, every third connecting portions, or with any desired distances, may be cut off from one of the primary portions and then bent upwardly. As shown in FIG. 5, the connecting portions 16a may be cut off alternately from the two primary portions 15, 15. It will be noted in passing that since the connecting portions 16a are cut off only from one of the primary portions 15 in the insert 13 shown in FIG. 3, a cutter roller or roll forming device can be simpler in structure than that used to form the insert shown in FIG. 5.

While there has been described what is at present considered to be the preferred embodiments of the invention, it will be understood that the invention is not limited thereto, and that various changes and modifications may be made without departing from the scope of the invention.

What is claimed is:

1. A weather strip comprising:
   (a) an insert made of metal and having W section; and
   (b) a cover member adapted to cover said insert and made of polymeric resilient materials;

said insert being formed from a metal piece,
   said metal piece including two longitudinally extending primary portions in parallel relation and a multiplicity of secondary portions extending perpendicularly to said primary portions, each of said secondary portions having a connecting portion interconnecting said primary portions and two projecting portions extending outwardly from opposite ends of said connecting portion,
   said projecting portions being bent upwardly while preselected connecting portions being cut off from one of said primary portions and bent upwardly at their centers.

2. A weather strip according to claim 1, wherein said preselected connecting portions of said secondary portions are all cut off only from a selected one of said primary portions.

* * * * *